US009292678B2

(12) United States Patent
Keohane et al.

(10) Patent No.: US 9,292,678 B2
(45) Date of Patent: Mar. 22, 2016

(54) UNLOCKING A COMPUTING DEVICE VIA IMAGES

(71) Applicant: International Business Machines Corporation, Armonk, NY (US)

(72) Inventors: Susann M. Keohane, Austin, TX (US); Shawn P. Mullen, Buda, TX (US); Jessica C. Murillo, Round Rock, TX (US); Johnny M. Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 14/219,461

(22) Filed: Mar. 19, 2014

(65) Prior Publication Data

US 2015/0269376 A1 Sep. 24, 2015

(51) Int. Cl.
| | |
|---|---|
| *H04L 29/06* | (2006.01) |
| *G06F 21/36* | (2013.01) |
| *G06F 21/44* | (2013.01) |
| *G06F 3/0488* | (2013.01) |

(52) U.S. Cl.
CPC ............ *G06F 21/36* (2013.01); *G06F 3/04883* (2013.01); *G06F 21/44* (2013.01); *G06F 2221/2103* (2013.01); *G06F 2221/2129* (2013.01); *G06F 2221/2133* (2013.01)

(58) Field of Classification Search
CPC .............................. G06F 21/36; G06F 3/04883
See application file for complete search history.

(56) References Cited

U.S. PATENT DOCUMENTS

| | | | |
|---|---|---|---|
| 6,408,301 B1 * | 6/2002 | Patton et al. | 707/741 |
| 6,934,860 B1 | 8/2005 | Goldstein | |
| 7,219,368 B2 | 5/2007 | Juels et al. | |
| 8,117,458 B2 | 2/2012 | Osborn, III et al. | |
| 8,458,485 B2 * | 6/2013 | Bandyopadhyay et al. | 713/184 |
| 8,832,810 B2 * | 9/2014 | Cheswick et al. | 726/7 |
| 8,881,251 B1 * | 11/2014 | Hilger | H04L 63/083 713/183 |
| 2004/0230843 A1 * | 11/2004 | Jansen | 713/202 |
| 2005/0060554 A1 | 3/2005 | O'Donoghue | |

(Continued)

FOREIGN PATENT DOCUMENTS

| | | |
|---|---|---|
| CN | 102609204 A | 7/2012 |
| WO | WO2013189231 A1 | 12/2013 |

OTHER PUBLICATIONS

Park, Mirang, et al. "Proposal of a Puzzle Authentication Method with Shoulder-surfing Attack Resistance." Network-Based Information Systems (NBiS), 2014 17th International Conference on. IEEE, 2014.*

*Primary Examiner* — Shawnchoy Rahman
(74) *Attorney, Agent, or Firm* — Francis Lammes; Stephen J. Walder, Jr.; William J. Stock (57) ABSTRACT

A mechanism is provided for unlocking a locked computing device based on a knowledge of a user. Responsive to detecting an intent to utilize the locked computing device, a subset of the images is randomly selecting in an identified tag category from a plurality of tagged images, the subset of images comprising a plurality of tags in the identified tag category. An order in which the user must gesture to the plurality of tags in the subset of images is randomly selected. The subset of images and the order in which the user must gesture to the plurality of tags in the subset of images to the user is presented to the user. Responsive to the user gesturing to a subset of tags in the subset of images in the selected order, the locked computing device is unlocked.

20 Claims, 4 Drawing Sheets

(56) References Cited

U.S. PATENT DOCUMENTS

| | | | |
|---|---|---|---|
| 2007/0083919 A1* | 4/2007 | Heffez | 726/5 |
| 2009/0016576 A1* | 1/2009 | Goh et al. | 382/118 |
| 2010/0325721 A1* | 12/2010 | Bandyopadhyay et al. | 726/19 |
| 2011/0283353 A1 | 11/2011 | Maetz et al. | |
| 2013/0047252 A1 | 2/2013 | Johnson et al. | |
| 2013/0097697 A1 | 4/2013 | Zhu et al. | |
| 2013/0238968 A1* | 9/2013 | Barrus | 715/227 |
| 2013/0321297 A1 | 12/2013 | Li | |
| 2014/0104494 A1* | 4/2014 | Begeja et al. | 348/564 |
| 2014/0317723 A1* | 10/2014 | Hicks | G06F 21/36 726/19 |
| 2014/0366164 A1* | 12/2014 | Hoefgen et al. | 726/34 |

* cited by examiner

UNLOCKING A COMPUTING DEVICE VIA IMAGES

BACKGROUND

The present application relates generally to an improved data processing apparatus and method and more specifically to mechanisms for unlocking a computing device via images.

Picture passwords allow users to unlock computing devices by drawing gestures such as points, lines, and circles on a chosen image. Picture passwords free users from the traditional and less secure unlock methods because there are close to an infinite number of combination of gestures. Picture passwords provide an effective layer of protection against the common methods of illegal access gaining to a computing device, such as brute-force password hacking.

SUMMARY

In one illustrative embodiment, a method, in a data processing system, is provided for unlocking a locked computing device based on a knowledge of a user. The illustrative embodiment randomly selects a subset of the images in an identified tag category from a plurality of tagged images in response to detecting an intent to utilize the locked computing device. In the illustrative embodiment, the subset of images comprise a plurality of tags in the identified tag category. The illustrative embodiment randomly selects an order in which the user must gesture to the plurality of tags in the subset of images. The illustrative embodiment presents the subset of images and the order in which the user must gesture to the plurality of tags in the subset of images to the user. The illustrative embodiment unlocks the locked computing device in response to the user gesturing to a subset of tags in the subset of images in the selected order.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Again, picture passwords provide an effective layer of protection against the common methods of illegal access gaining to a computing device, such as brute-force password hacking. However, the use of picture passwords fails to provide protection against shoulder-surfing or analysis of finger grease on the screen of the computing device to figure out your picture password.

Therefore, the illustrative embodiments provide the use of multiple images, selected at random, that have specific metadata associated with each image. This metadata may include name information, such as first, middle, and last names of all of persons present in the image; specific date information, such as birth date, anniversary date, graduation date, or deceased date of all of persons present in the image; specific location information associated with the image; a specific date associated with when the image was captured; specific dates associated with objects appearing in the image; or the like.

Once a plurality of images and associated metadata have been identified by a user and the computing device has been locked, when a user of the computing device indicates an intent to utilize the computing device, the illustrative embodiments provide a locking/unlocking mechanism that randomly selects a category from the plurality of metadata that has been provided with the plurality of images. Of a predetermined number of images with an associated metadata category, the locking/unlocking mechanism may select, for example, middle names, anniversary dates, location, object dates, or the like. Once the metadata category has been selected, the locking/unlocking mechanism randomly selects a subset of the images from the plurality of images based on the selected metadata category, such as a subset of images with identified middle names, a subset of images with identified anniversary dates, a subset of images with identified location information, a subset of images with identified object date information, or the like.

The locking/unlocking mechanism then presents the subset of images to the user with an identification of an order in which the user is to indicate or gesture to the people, location, or objects in the subset of images. For example, the locking/unlocking mechanism may present one image with multiple persons or multiple images with one or more person in the each image and indicate to the user to select the people in middle name order. As an additional example, the locking/unlocking mechanism may present one image with multiple persons or multiple images with more than one person in the image and indicate to the user to select the people in anniversary date order. As still a further example, the locking/unlocking mechanism may present a subset of images illustrating locations to the user indicating to the user to select the locations based on a date on which the locations were visited by the user, either in an ascending or a descending order.

Thus, based on the subset of images and the indication provided by the locking/unlocking mechanism of the illustrative embodiments, the user is required to use a self-knowledge base to select the persons, locations, or objects of the subset of presented images in the indicated order. If the user selects the persons, locations, or objects of the subset of presented images in the indicated order, then the locking/unlocking mechanism grants access to the computing device. If the user fails to select the persons, locations, or objects of the subset of presented images in the indicated order, then, depending on the predetermined setting indicated by the user when the locking/unlocking mechanism was initialized, the locking/unlocking mechanism may lock the computing device for a predetermined time interval in which the user cannot attempt to unlock the computing device or present another subset of images to the user with an different identification of an order in which the user is to indicate or gesture to the people, location, or objects in the subset of images.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure, or method for executing the functions, or a combination of the above.

Figure 1:
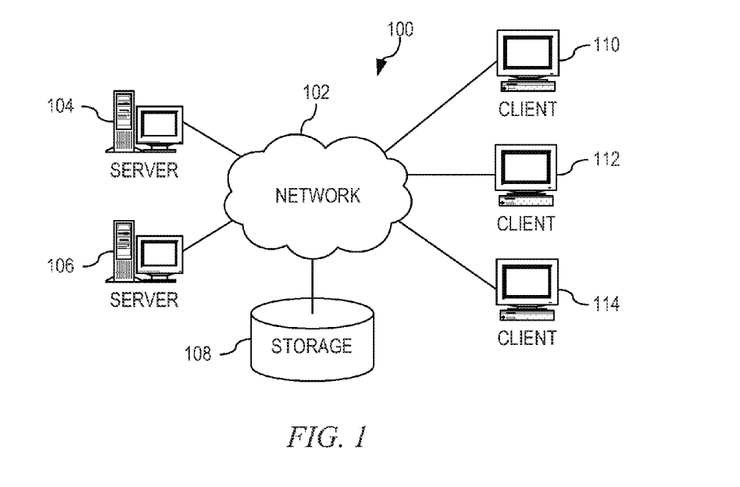
FIG. 1 is an example diagram of a distributed data processing system in which aspects of the illustrative embodiments may be implemented.
Figure 2:
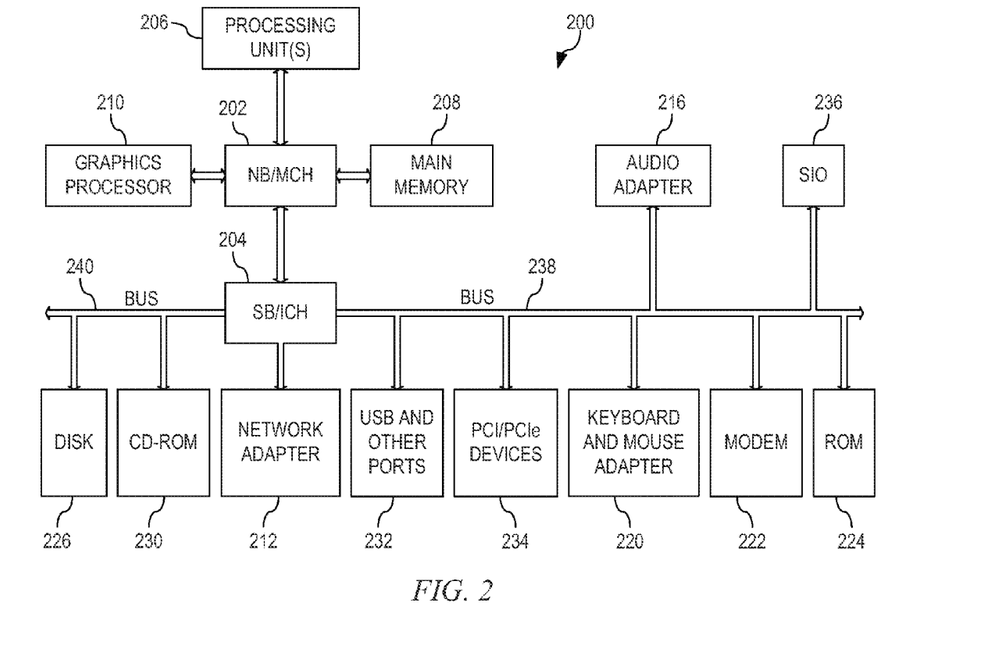
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System P® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
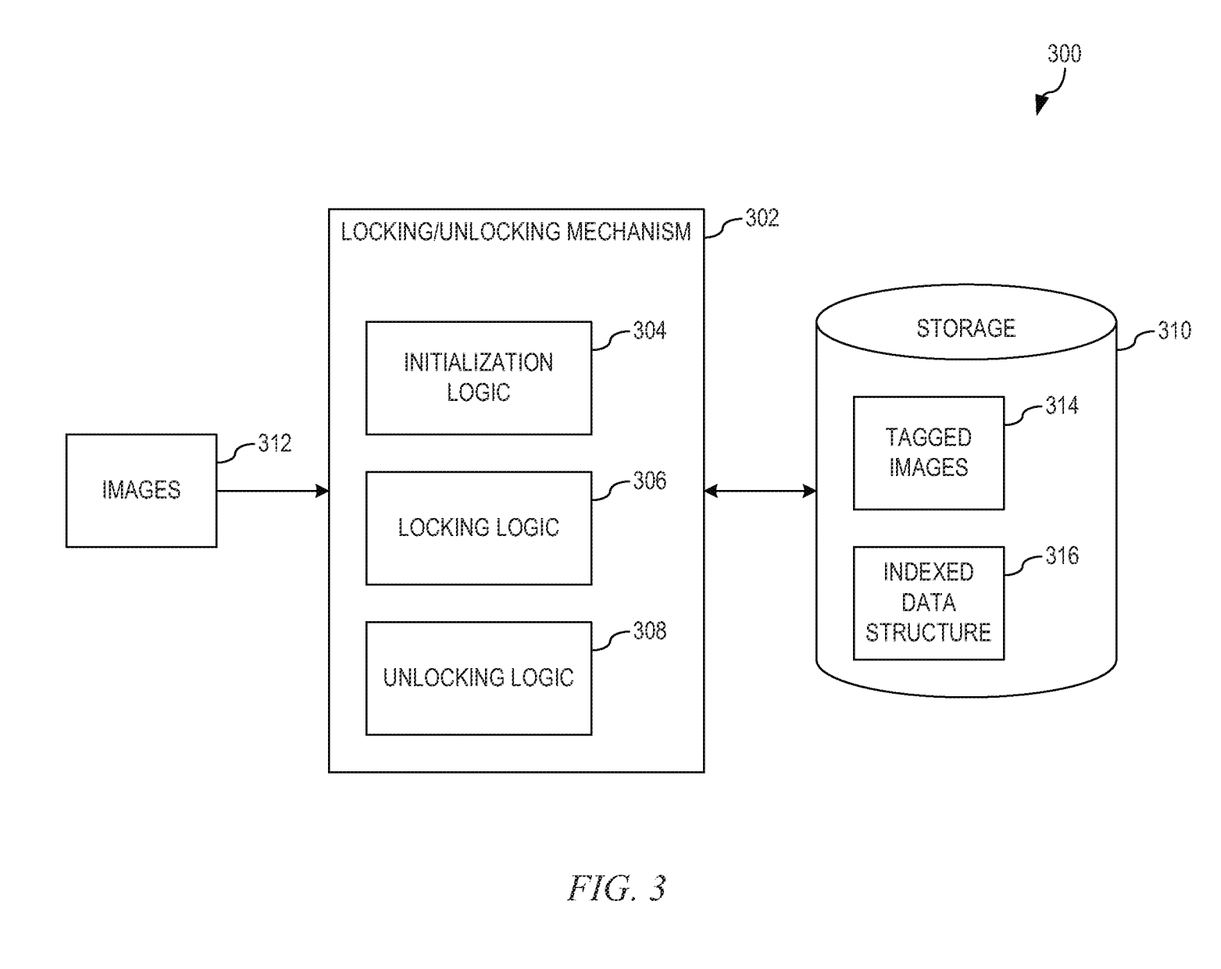
FIG. 3 depicts a computing device locking/unlocking mechanism in accordance with an illustrative embodiment.

FIG. 3 depicts a computing device locking/unlocking mechanism in accordance with an illustrative embodiment. Locking/unlocking mechanism 302 within computing device 300 comprises initialization logic 304, locking logic 306, and unlocking logic 308. At initialization, initialization logic 304 prompts the user for a plurality of images 312 with which to initialize locking/unlocking mechanism 302. For each of the plurality of images 312, initialization logic 304 prompts the user to tag one or more of a person, group of persons, object, location, or the like, within the image. Each tag may be associated with a first name, a middle name, a last name, a maiden name, a birth date, an anniversary date, a graduation date, a deceased date, a city, a state, a country, a data that the image was taken, a date associated with an object (a date associated with a bottle of wine, a date associated with a lost tooth, or the like), or the like. As the user tags one or more portions of each image, initialization logic 304 stores the image and its associated tags in storage 310 as a tagged image 314. Initialization logic 304 also creates an indexed data structure 316 for the plurality of tagged images 314 indexed by a category based on the tags associated with each of the tagged images 314.

Once the plurality of tagged images 314 and indexed data structure have been populated, locking/unlocking mechanism 302 may be enabled to protect computing device 300. Once computing device 300 has been locked via locking logic 306, unlocking logic 308 monitors computing device 300 for an indication of access. When unlocking logic 308 detects an intent to utilize computing device 300, unlocking logic 308 selects a category from the plurality of metadata indexed in indexed data structure 316. The selection of the category from the plurality of metadata indexed in indexed data structure 316 may be in an order predetermined by the user and implemented by unlocking logic 308 or randomly selected by unlocking logic 308. Once unlocking logic 308 has selected a category, unlocking logic 308 determines whether a number of tagged images in the plurality of tagged images 314 with tags in the selected category is greater than a predetermined required number of tags. That is, if the predetermined required number of tags is five, then unlocking logic 308 ensures that there are at least five tags of that category in the plurality of tagged images 314, whether there are five tags within one image, five tags in five different images, or some combination thereof.

If unlocking logic 308 determines that there is the predetermined number of tags within the plurality of tagged images 314, unlocking logic 308 selects a subset of the images from the plurality of tagged images 314 based on the selected metadata category. The selection of the subset of images from the plurality of tagged images 314 may be in an order predetermined by the user and implemented by unlocking logic 308 or randomly selected by unlocking logic 308. Again, unlocking logic 308 may select one image with the required number of tags in the selected category, a plurality of images comprising one tag each meeting the required number of tags in the selected category, or some combination thereof. Unlocking logic 308 then presents the subset of images to the user with an identification of an order in which the user is to indicate or gesture to the people, location, or objects in the subset of images. The order may be one of: ascending date order or descending date order if the category is related to date, ascending alphabetical order or descending date order if the category is related to a name or location, ascending numerical order or descending numerical order if the category has to do with age, time, or the like, farthest to nearest or nearest to farthest if the category has to do with proximity, or the like. For example, unlocking logic 308 may present one image with multiple persons or multiple images with one or more person in the each image and indicate to the user to select the people in middle name order from A-Z. As an additional example, unlocking logic 308 may present one image with multiple persons or multiple images with one or more person in the each image and indicate to the user to select the people in a descending anniversary date order. As still a further example, unlocking logic 308 may present a subset of images illustrating locations to the user indicating to the user to select the locations based on a date on which the locations were visited by the user in an ascending date order or based on proximity of the locations from nearest to farthest. Further, the order in which the user is to indicate or gesture to the people, location, or objects in the subset of images may be in an order predetermined by the user and implemented by unlocking logic 308 or randomly selected by unlocking logic 308.

With the subset of images presented to the user, the user is required to use a self-knowledge base to select the persons, locations, or objects of the subset of presented images in the indicated order. Unlocking logic 308 then monitors the user input as to whether the user has selected the persons, locations, or objects of the subset of presented images in the indicated order. If unlocking logic 308 determines that the user selects the persons, locations, or objects of the subset of presented images in the indicated order, then unlocking logic 308 grants access to computing device 300. If unlocking logic 308 determines that the user fails to select the persons, locations, or objects of the subset of presented images in the indicated order, then, depending on the predetermined setting indicated by the user when locking/unlocking mechanism 302 was initialized, unlocking logic 308 may lock computing device 300 for a predetermined time interval in which the user cannot attempt to unlock computing device 300 or present another subset of images to the user with a different identification of an order in which the user is to indicate or gesture to the people, location, or objects in the subset of images.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
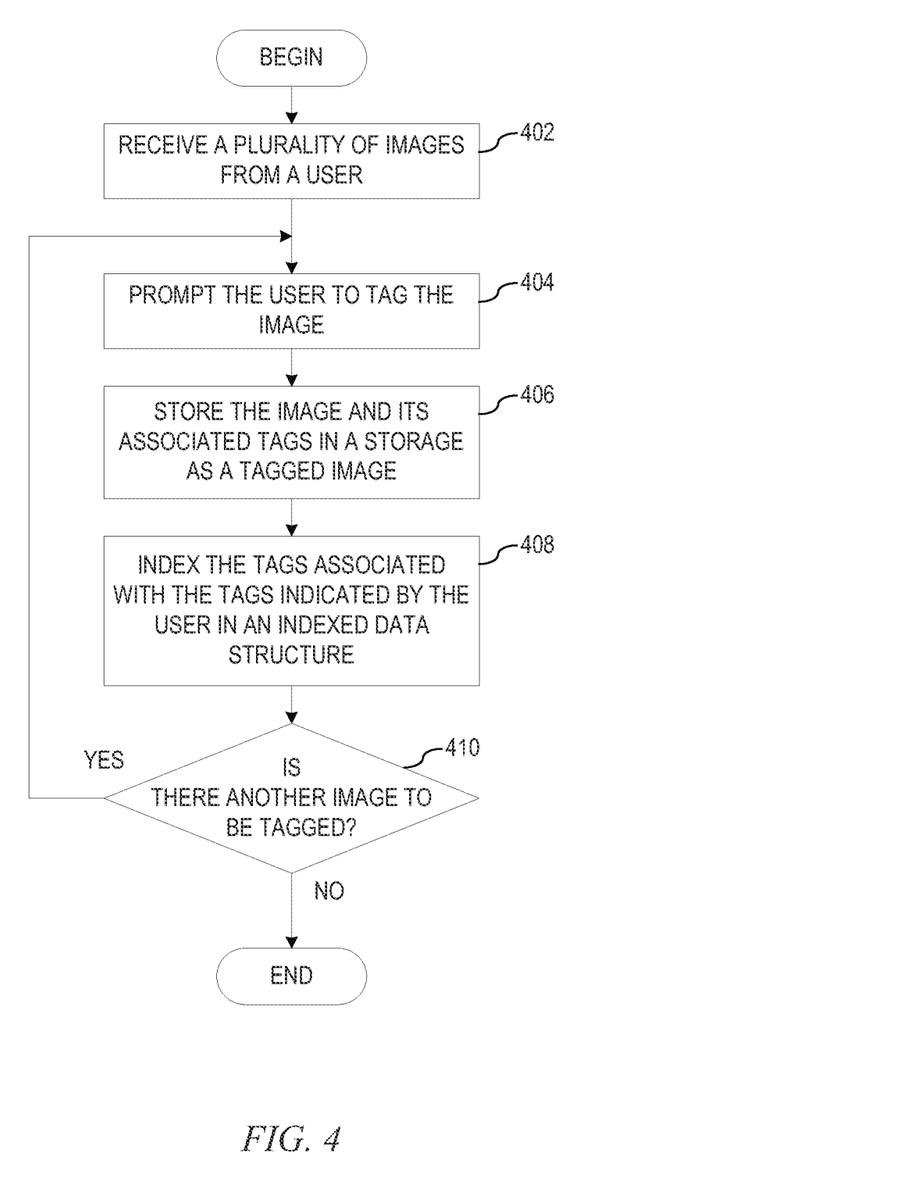
FIG. 4 depicts a flow diagram of the process performed in initializing a locking/unlocking mechanism in accordance with an illustrative embodiment.

FIG. 4 depicts a flow diagram of the process performed in initializing a locking/unlocking mechanism in accordance with an illustrative embodiment. As the operation begins, the locking/unlocking mechanism receives a plurality of images from a user (step 402). For each image of the plurality of images, the locking/unlocking mechanism prompts the user to tag the image with one or more of a person, group of persons, object, location, or the like, within the image (step 404). Each tag may be associated with a first name, a middle name, a last name, a maiden name, a birth date, an anniversary date, a graduation date, a deceased date, a city, a state, a country, a date that the image was taken, a date associated with an object, or the like. As the user tags one or more portions of each image, the locking/unlocking mechanism stores the image and its associated tags in a storage as a tagged image (step 406). The locking/unlocking mechanism also indexes the tags associated with the tags indicated by the user in an indexed data structure for the plurality of tagged images indexed by category based on the tags associated with each of the tagged images (step 408). The locking/unlocking mechanism then determines whether there is another image to be tagged (step 410). If at step 410 there is another image to be tagged, then the operation returns to step 404. If at step 410 there is not another image to be tagged, then the operation ends, until the user adds another image.

Figure 5:
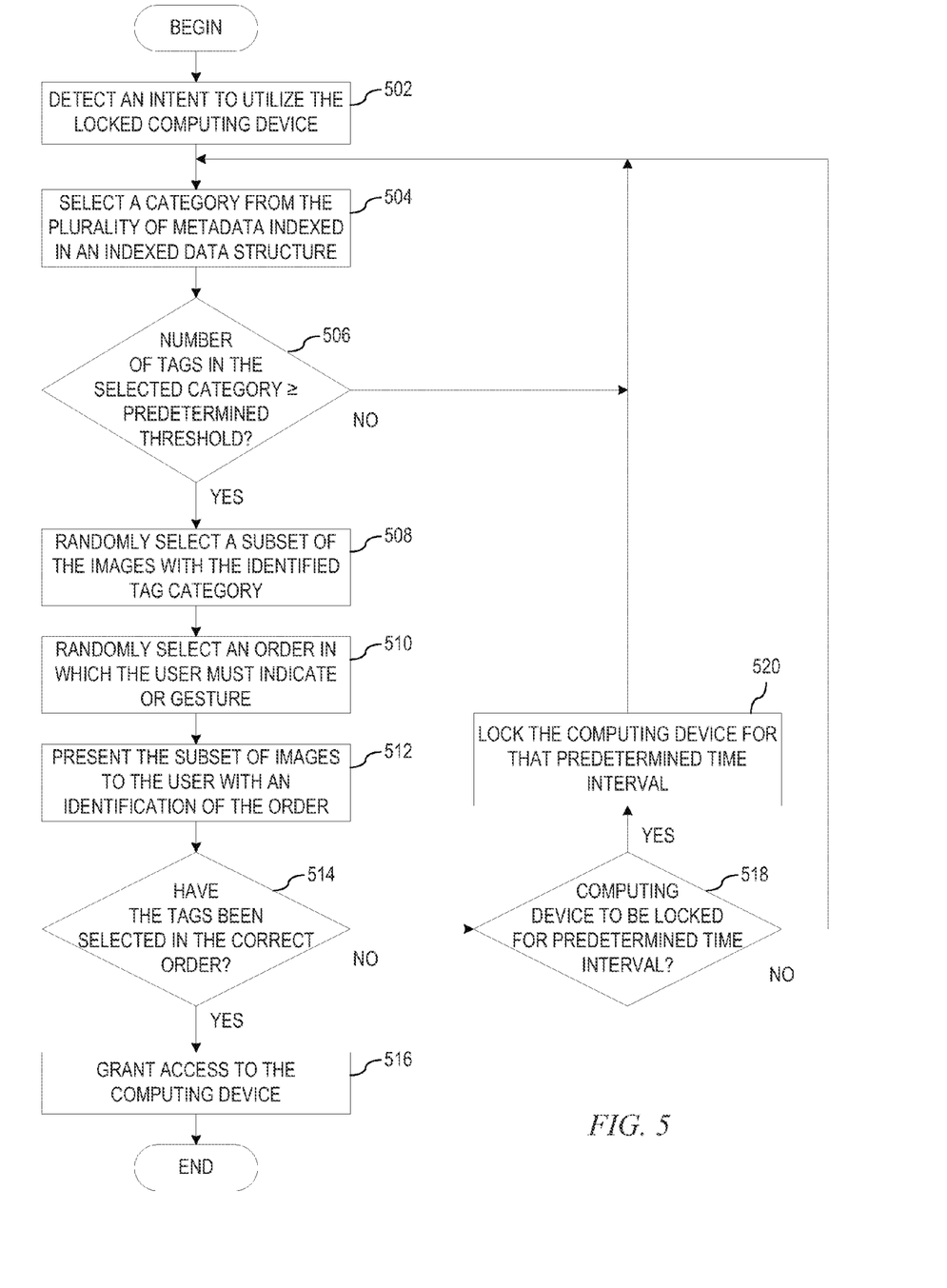
FIG. 5 depicts a flow diagram of the process performed in unlocking a locked computing device utilizing a locking/unlocking mechanism in accordance with an illustrative embodiment.

FIG. 5 depicts a flow diagram of the process performed in unlocking a locked computing device utilizing a locking/unlocking mechanism in accordance with an illustrative embodiment. As the operation begins, the locking/unlocking mechanism detects an intent to utilize the locked computing device (step 502). The locking/unlocking mechanism selects a category from the plurality of metadata indexed in an indexed data structure (step 504). The selection of the category from the plurality of metadata indexed in the indexed data structure may be in an order predetermined by the user and implemented by the locking/unlocking mechanism or randomly selected by the locking/unlocking mechanism. The locking/unlocking mechanism determines whether the number of tags in the selected category associated with the tagged images in storage is equal to or above a predetermined threshold (step 506). If at step 506 the locking/unlocking mechanism determines that the number of tags in the selected category associated with the tagged images in storage is less than the predetermined threshold, then the operation returns to step 504 where the locking/unlocking mechanism chooses another category. If at step 506 the locking/unlocking mechanism determines that the number of tags in the selected category associated with the tagged images in storage is equal to or above a predetermined threshold, then the locking/unlocking mechanism selects a subset of the images with the identified tag category from the plurality of tagged images based on the selected metadata category (step 508). The selection of the subset of images from the plurality of tagged images may be in an order predetermined by the user and implemented by the locking/unlocking mechanism or randomly selected by the locking/unlocking mechanism.

The locking/unlocking mechanism then selects an order in which the user must indicate or gesture the persons, locations, or objects from the subset of images (step 510). The order in which the user is to indicate or gesture to the people, location, or objects in the subset of images may be in an order predetermined by the user and implemented by the locking/unlocking mechanism or randomly selected by the locking/unlocking mechanism. The locking/unlocking mechanism then presents the subset of images to the user with an identification of the order in which the user is to indicate or gesture to the people, location, or objects in the subset of images (step 512). Again, the order may be one of: ascending date order or descending date order if the category is related to date, ascending alphabetical order or descending date order if the category is related to a name or location, ascending numerical order or descending numerical order if the category has to do with age, time, or the like, farthest to nearest or nearest to farthest if the category has to do with proximity, or the like.

With the subset of images presented to the user, the user is required to use a self-knowledge base to select the persons, locations, or objects of the subset of presented images in the indicated order. The locking/unlocking mechanism monitors the user input as to whether the user has selected the persons, locations, or objects of the subset of presented images in the indicated order (step 514). If at step 514 the locking/unlocking mechanism determines that the user indicates or gestures to the persons, locations, or objects of the subset of presented images in the indicated order, then the locking/unlocking mechanism grants access to the computing device (step 516), with the operation ending thereafter. If at step 514 the locking/unlocking mechanism determines that the user fails to indicate or gesture to the persons, locations, or objects of the subset of presented images in the indicated order, then, depending on the predetermined setting indicated by the user when the locking/unlocking mechanism was initialized, the locking/unlocking mechanism determines whether the computing device should be locked for a predetermined time interval in which the user cannot access the computing device (step 518). If at step 518 the locking/unlocking mechanism determines that the computing device should be locked for the predetermined time interval in which the user cannot access the computing device, then the locking/unlocking mechanism locks the computing device for that predetermined time interval (step 520) and, once the time interval expires, the operation returns to step 504. If at step 518 the locking/unlocking mechanism determines that the computing device does not need to be locked for the predetermined time interval in which the user cannot access the computing device, the operation proceeds to step 504.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for allowing a user to unlock a locked computing device based on the knowledge of the user. One or more images are presented to a user from which the user must utilize his/her knowledge of the one or more images to indicate or gesture to persons, locations, or objects within the one or more images in an indicated order. The order may be associated with, for example, name information, such as first, middle, and last names of all of the persons present in the image; specific date information, such as birth date, anniversary date, graduation date, or deceased date of all of persons present in the image, specific location information associated with the image; a specific date associated with when the image was captured; specific dates associated with objects appearing in the image; or the like. The indicated order may be one of, for example, ascending date order or descending date order if the category is related to date, ascending alphabetical order or descending date order if the category is related to a name or location, ascending numerical order or descending numerical order if the category has to do with age, time, or the like, farthest to nearest or nearest to farthest if the category has to do with proximity, or the like.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for unlocking a locked computing device based on the knowledge of a user, the method comprising:
   responsive to detecting an intent to utilize the locked computing device, randomly selecting a subset of images in an identified tag category from a plurality of tagged images, wherein the subset of images comprise a plurality of tags in the identified tag category;
   randomly selecting an order in which the user must gesture to the plurality of bags in the subset of images;
   presenting the subset of images and the order in which the user must gesture to the plurality of tags in the subset of images to the user; and
   responsive to the user gesturing to a subset of tags in the subset of images in the selected order, unlocking the locked computing device.

2. The method of claim 1, wherein randomly selecting the subset of the images in the identified tag category from the plurality of tagged images comprises:
   randomly selecting a tag category from a plurality of metadata indexed in an indexed data structure;
   determining whether a number of tags in the selected tag category is equal to or above a predetermined threshold;
   responsive to the number of tags in the selected tag category being less than the predetermined threshold, randomly selecting a different tag category from the plurality of metadata indexed in the indexed data structure; and
   responsive to the number of tags in the selected tag category being equal to or greater than the predetermined threshold, selecting the subset of the images in the identified tag category from the plurality of tagged images.

3. The method of claim 1, wherein tags in each image of the plurality of images comprise one or more of a first name, a middle name, a last name, a maiden name, a birth date, an anniversary date, a graduation date, a deceased date, a location associated with the image, a date associated with when the image was captured, or a date associated with an object appearing in the image.

4. The method of claim 1, wherein the order is an ascending date order or a descending date order if the tag category is related to date.

5. The method of claim 1, wherein the order is an ascending alphabetical order or a descending alphabetical order if the tag category is related to a name or location.

6. The method of claim 1, wherein the order is an ascending numerical order or a descending numerical order if the tag category is related to age or time.

7. The method of claim 1, wherein the order is farthest to nearest or nearest to farthest if the tag category is related to proximity.

8. The method of claim 1, further comprising:
   responsive to the user failing to gesture to the subset of tags in the selected order, locking the computing device for a predetermined time period before another attempt to unlock the locked computing device can be attempted.

9. A computer program product comprising a computer readable storage medium having a computer readable program stored therein, wherein the computer readable program, when executed on a computing device, causes the computing device to:
   responsive to detecting an intent to utilize a locked computing device, randomly select a subset of images in an identified tag category from a plurality of tagged images, wherein the subset of images comprise a plurality of tags in the identified tag category;
   randomly select an order in which the user must gesture to the plurality of tags in the subset of images;
   present the subset of images and the order in which the user must gesture to the plurality of tags in the subset of images to the user; and
   responsive to the user gesturing to a subset of tags in the subset of images in the selected order, unlock the locked computing device.

10. The computer program product of claim 9, wherein the computer readable program to randomly select the subset of the images in the identified tag category from the plurality of tagged images further causes the computing device to:
    randomly select a tag category from a plurality of metadata indexed in an indexed data structure;
    determine whether a number of tags in the selected tag category is equal to or above a predetermined threshold;
    responsive to the number of tags in the selected tag category being less than the predetermined threshold, randomly select a different tag category from the plurality of metadata indexed in the indexed data structure; and
    responsive to the number of tags in the selected tag category being equal to or greater than the predetermined threshold, selecting the subset of the images in the identified tag category from the plurality of tagged images.

11. The computer program product of claim 9, wherein tags in each image of the plurality of images comprise one or more of a first name, a middle name, a last name, a maiden name, a birth date, an anniversary date, a graduation date, a deceased date, a location associated with the image, a date associated with when the image was captured, or a date associated with an object appearing in the image.

12. The computer program product of claim 9, wherein the order is an ascending date order or a descending date order if the tag category is related to date and wherein the order is an ascending alphabetical order or a descending alphabetical order if the tag category is rebated to a name or location.

13. The computer program product of claim 9, wherein the order is an ascending numerical order or a descending numerical order if the tag category is related to age or time and wherein the order is farthest to nearest or nearest to farthest if the tag category is related to proximity.

14. The computer program product of claim 9, wherein the computer readable program further causes the computing device to:
responsive to the user failing to gesture to the subset of tags in the selected order, lock the computing device for a predetermined time period before another attempt to unlock the locked computing device can be attempted.

15. An apparatus comprising:
a processor; and
a memory coupled to the processor, wherein the memory comprises instructions which, when executed by the processor, cause the processor to:
responsive to detecting an intent to utilize a locked computing device, randomly select a subset of images in an identified tag category from a plurality of tagged images, wherein the subset of images comprise a plurality of tags in the identified tag category;
randomly select an order in which the user must gesture to the plurality of tags in the subset of images;
present the subset of images and the order in which the user must gesture to the plurality of tags in the subset of images to the user; and
responsive to the user gesturing to a subset of tags in the subset of images in the selected order, unlock the locked computing device.

16. The apparatus of claim 15, wherein the instructions to randomly select the subset of the images in the identified tag category from the plurality of tagged images further cause the processor to:
randomly select a tag category from a plurality of metadata indexed in an indexed data structure;
determine whether a number of tags in the selected tag category is equal to or above a predetermined threshold;
responsive to the number of tags in the selected tag category being less than the predetermined threshold, randomly select a different tag category from the plurality of metadata indexed in the indexed data structure; and
responsive to the number of tags in the selected tag category being equal to or greater than the predetermined threshold, selecting the subset of the images in the identified tag category from the plurality of tagged images.

17. The apparatus of claim 15, wherein tags in each image of the plurality of images comprise one or more of a first name, a middle name, a last name, a maiden name, a birth date, an anniversary date, a graduation date, a deceased date, a location associated with the image, a date associated with when the image was captured, or a date associated with an object appearing in the image.

18. The apparatus of claim 15, wherein the order is an ascending date order or a descending date order if the tag category is related to date and wherein the order is an ascending alphabetical order or a descending alphabetical order if the tag category is related to a name or location.

19. The apparatus of claim 15, wherein the order is an ascending numerical order or a descending numerical order if the tag category is related to age or time and wherein the order is farthest to nearest or nearest to farthest if the tag category is related to proximity.

20. The apparatus of claim 15, wherein the instructions further cause the processor to:
responsive to the user failing to gesture to the subset of tags in the selected order, lock the computing device for a predetermined time period before another attempt to unlock the locked computing device can be attempted.

* * * * *